(12) United States Patent
Lombardo

(10) Patent No.: US 6,390,911 B1
(45) Date of Patent: May 21, 2002

(54) SHELL SEAFOOD CRACKING AND SERVING DEVICE

(76) Inventor: Ciro Lombardo, 8228 W. Catherine, Chicago, IL (US) 60656

( * ) Notice: Subject to any disclaimer, the term of this patent is extended or adjusted under 35 U.S.C. 154(b) by 0 days.

(21) Appl. No.: 09/677,017

(22) Filed: Sep. 29, 2000

(51) Int. Cl.[7] .............................................. A22C 29/04
(52) U.S. Cl. ................... 452/12; 452/6; 452/1; 452/17; 30/322; 30/148; 30/137
(58) Field of Search ............... 452/6, 17, 1, 12; 30/148, 322, 137, 120.1

(56) References Cited

U.S. PATENT DOCUMENTS

| | | | | |
|---|---|---|---|---|
| 99,341 A | * | 2/1870 | Patterson | ..................... 30/322 |
| D28,444 S | * | 4/1898 | Richardson | |
| 1,028,961 A | * | 6/1912 | Porter | |
| 1,313,417 A | * | 8/1919 | Raymond | |
| 1,644,119 A | * | 10/1927 | Fowler | |
| D103,241 S | | 2/1937 | Lowenstein | |
| 2,521,245 A | * | 9/1950 | Murphy | |
| 2,637,104 A | | 5/1953 | Samson | |
| 2,835,971 A | | 5/1958 | Neuman | |
| 3,552,017 A | | 1/1971 | Smuts | |
| 3,609,865 A | | 10/1971 | Golden | |
| 4,200,961 A | * | 5/1980 | Mueller | ........................ 452/6 |
| 4,569,103 A | * | 2/1986 | Taurinskas | ..................... 452/6 |
| 4,691,440 A | * | 9/1987 | Ushigome | ..................... 30/322 |
| 5,373,640 A | | 12/1994 | Cordeiro, Jr. | |
| 5,542,181 A | * | 8/1996 | Gaylord | ....................... 30/148 |
| 5,613,904 A | * | 3/1997 | LaSalle et al. | ................. 452/6 |

* cited by examiner

Primary Examiner—Peter M. Poon
Assistant Examiner—Andrea M. Valenti

(57) ABSTRACT

A shell seafood cracking and serving device for cracking shell seafood with little mess and effort by the user. The shell seafood cracking and serving device includes a utensil having a handle member and a seafood cracking member being securely attached at an end of the handle member.

1 Claim, 2 Drawing Sheets

SHELL SEAFOOD CRACKING AND SERVING DEVICE

BACKGROUND OF THE INVENTION

1. Field of the Invention

The present invention relates to a shell cracking and food removing device and more particularly pertains to a new shell seafood cracking and serving device for cracking shell seafood with little mess and effort by the user.

2. Description of the Prior Art

The use of a shell cracking and food removing device is known in the prior art. More specifically, a shell cracking and food removing device heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,373,640; U.S. Pat. No. 3,609,865; U.S. Pat. No. 3,552,017; U.S. Pat. No. 2,835,971; U.S. Pat. No. 2,637,104; and U.S. Pat. No. Des. 103,241.

While these devices fulfill their respective, particular objectives and requirements, the aforementioned patents do not disclose a new shell seafood cracking and serving device. The inventive device includes a utensil having a handle member and a seafood cracking member being securely attached at an end of the handle member.

In these respects, the shell seafood cracking and serving device according to the present invention substantially departs from the conventional concepts and designs of the prior art, and in so doing provides an apparatus primarily developed for the purpose of cracking shell seafood with little mess and effort by the user.

SUMMARY OF THE INVENTION

In view of the foregoing disadvantages inherent in the known types of shell cracking and food removing device now present in the prior art, the present invention provides a new shell seafood cracking and serving device construction wherein the same can be utilized for cracking shell seafood with little mess and effort by the user.

The general purpose of the present invention, which will be described subsequently in greater detail, is to provide a new shell seafood cracking and serving device which has many of the advantages of the shell cracking and food removing device mentioned heretofore and many novel features that result in a new shell seafood cracking and serving device which is not anticipated, rendered obvious, suggested, or even implied by any of the prior art shell cracking and food removing device, either alone or in any combination thereof.

To attain this, the present invention generally comprises a utensil having a handle member and a seafood cracking member being securely attached at an end of the handle member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new shell seafood cracking and serving device which has many of the advantages of the shell cracking and food removing device mentioned heretofore and many novel features that result in a new shell seafood cracking and serving device which is not anticipated, rendered obvious, suggested, or even implied by any of the prior art shell cracking and food removing device, either alone or in any combination thereof.

It is another object of the present invention to provide a new shell seafood cracking and serving device which may be easily and efficiently manufactured and marketed.

It is a further object of the present invention to provide a new shell seafood cracking and serving device which is of a durable and reliable construction.

An even further object of the present invention is to provide a new shell seafood cracking and serving device which is susceptible of a low cost of manufacture with regard to both materials and labor, and which accordingly is then susceptible of low prices of sale to the consuming public, thereby making such shell seafood cracking and serving device economically available to the buying public.

Still yet another object of the present invention is to provide a new shell seafood cracking and serving device which provides in the apparatuses and methods of the prior art some of the advantages thereof, while simultaneously overcoming some of the disadvantages normally associated therewith.

Still another object of the present invention is to provide a new shell seafood cracking and serving device for cracking shell seafood with little mess and effort by the user.

Yet another object of the present invention is to provide a new shell seafood cracking and serving device which includes a utensil having a handle member and a seafood cracking member being securely attached at an end of the handle member.

Still yet another object of the present invention is to provide a new shell seafood cracking and serving device that allows the user to easily crack shell seafood and remove the food from the shell.

Even still another object of the present invention is to provide a new shell seafood cracking and serving device that cracks and open the shell seafood safely and quickly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
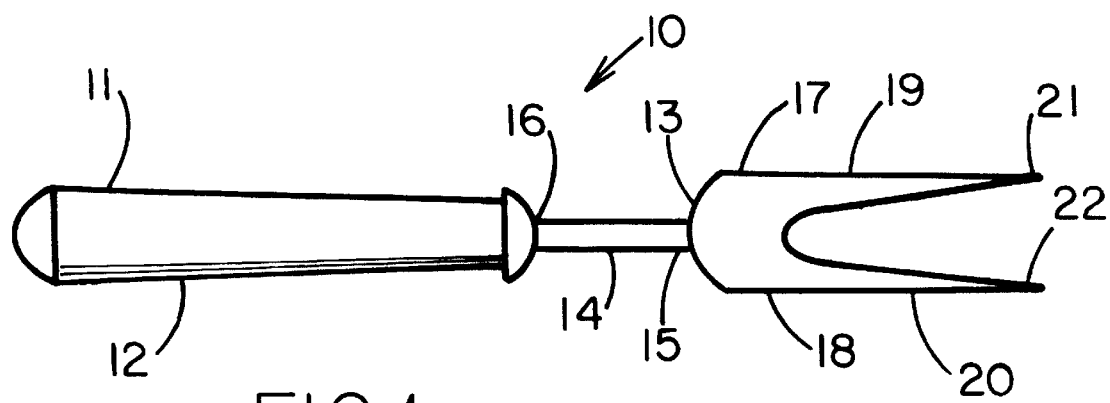
FIG. 1 is a top plan view of a first embodiment of a new shell seafood cracking and serving device according to the present invention.
Figure 2:
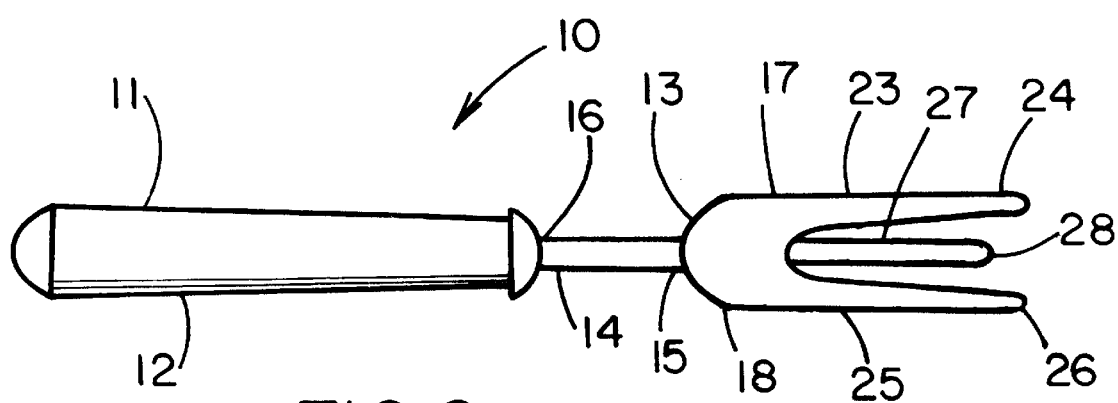
FIG. 2 is a top plan view of a second embodiment of the present invention.
Figure 3:
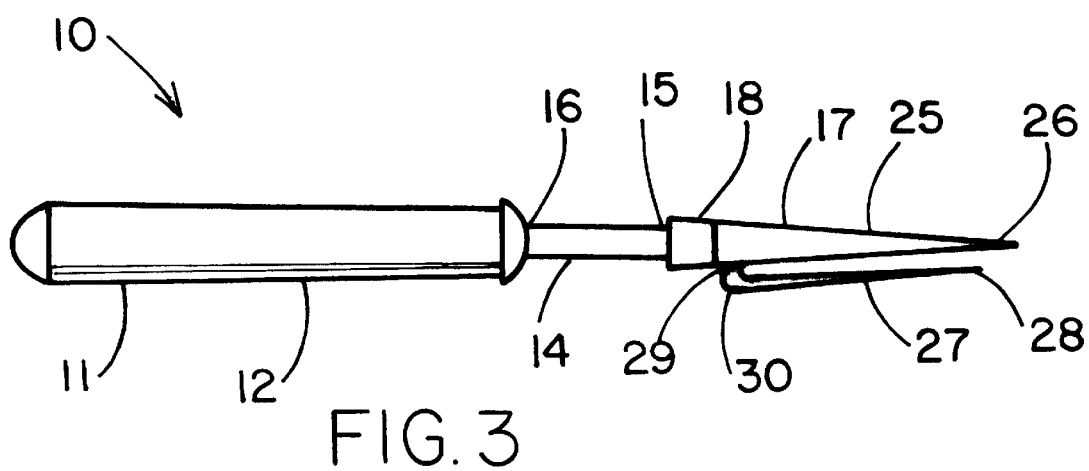
FIG. 3 is a side elevational view of the second embodiment of the present invention.
Figure 4:
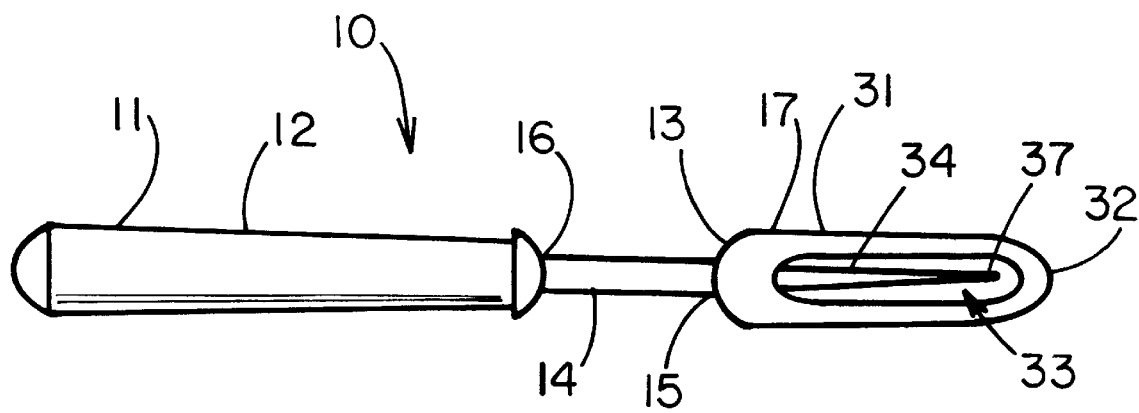
FIG. 4 is a to plan view of a third embodiment of the present invention.
Figure 5:
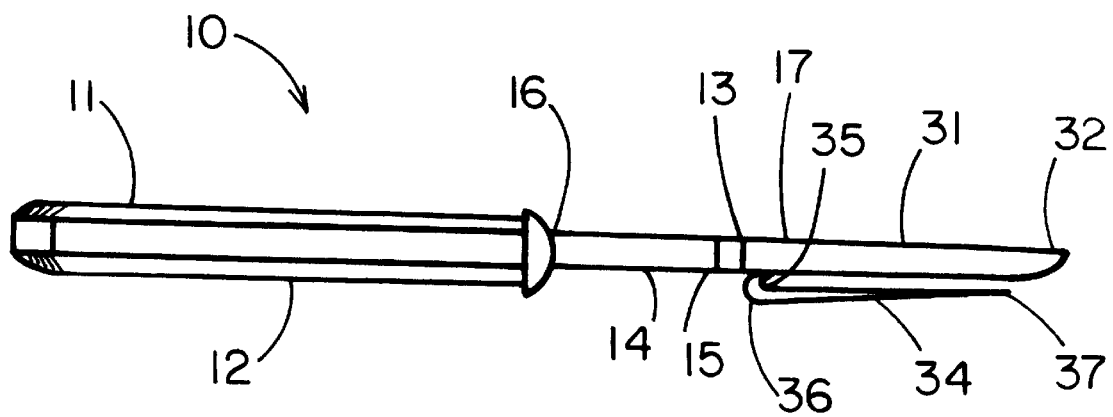
FIG. 5 is a side elevational view of the third embodiment of the present invention.

With reference now to the drawings, and in particular to FIGS. 1 through 5 thereof, a new shell seafood cracking and serving device embodying the principles and concepts of the present invention and generally designated by the reference numeral 10 will be described.

As best illustrated in FIGS. 1 through 5, the shell seafood cracking and serving device 10 generally comprises a utensil 11 having a handle member 12 and a seafood cracking member 13 being securely and conventionally attached at an end of the handle member 12. The seafood cracking member 13 includes a shaft portion 14 having a first end 15 and a second end 16 which is securely and conventionally attached to the handle member 12 and having a diameter which is relatively smaller than that of said handle member 12, and also includes a branched portion 17 being securely and conventionally attached to the first end 15 of the shaft portion 14 and being adapted to crack shell seafood.

As a first embodiment, the branched portion 17 includes a base portion 18 and a pair of prongs 19,20 having ends securely and conventionally attached to the base portion 18 with the prongs 19,20 being spaced apart and extending outwardly from the base portion 18 and being disposed in a plane. Each of the prongs 19,20 has a tapered and pointed outer end 21,22.

As a second embodiment, the branched portion 17 includes a base portion 18 having a first and second prongs 23,25 having ends securely and conventionally attached to the base portion 18. The first and second prongs 23,25 are spaced apart and extend outwardly from the base portion 18 and are disposed in a plane. The branched portion 17 also includes a third prong 27 having a first end 29 being securely and conventionally attached to the base portion 18 and extending outwardly from the base portion 18 and being generally offset from the plane of the first and second prongs 23,25. The third prong 27 also includes a main portion and a curved end portion 30 which includes the first end 29. The third prong 27 is spaced from the plane of the first and second prongs 23,25 with the first and second prongs 23,25 being attached to perimeters of the base portion 18, and with the third prong 27 being centrally attached to the base portion 27. The three prongs 23,25,27 have tapered outer ends 24,26,28.

As a third embodiment, the branched portion 17 includes an elliptical portion 31 having a rounded outer end 32 and an opening 33 centrally-disposed therethrough, and also includes a prong 34 having a first end 35 being securely and conventionally attached to the elliptical portion 31 and extending outwardly from the shaft portion 14 and being generally offset and spaced from the elliptical portion 31. The prong 34 includes a main portion and a curved first end portion 36 which includes the first end 35 of the third prong 34. The prong 34 is in alignment with the opening 33 of the elliptical portion 31 and has a tapered outer end 37.

In use, the user would insert the branched portion 18 in the seafood shell such as a crab and would slowly move the utensil 10 up to the surface of the shell with the handle member 12 being used to remove the food from the shell.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A shell seafood cracking and serving device, comprising:
    a utensil having a handle member and a seafood cracking member mounted on an end of said handle member, said seafood cracking member being adapted for cracking shell seafood and including a branched portion being attached to the first end of the shaft portion, said branched portion including.
        an elliptical portion comprising a plate forming a loop with an opening centrally-disposed therethrough, said elliptical portion generally in a plane; and
        a prong having a first end being attached to said elliptical portion and extending outwardly from said shaft portion, said prong having an upper surface extending in a plane being spaced from and substantially parallel to the plane of said elliptical portion;
    wherein said prong includes a main portion and a curved first end portion, said prong being positioned in alignment with and adjacent to said opening of said elliptical portion and having an outer end tapering to a point; and
    wherein a free end of said prong is positioned adjacent to the opening in said elliptical portion.

* * * * *